united States Patent [19]
Nakao et al.

[11] Patent Number: 5,992,822
[45] Date of Patent: Nov. 30, 1999

[54] AIR CONTROL VALVE

[75] Inventors: Kenji Nakao; Teruhiko Moriguchi; Takeshi Sugiyama, all of Tokyo, Japan

[73] Assignee: Mitsubishi Denki Kabushiki Kaisha, Tokyo, Japan

[21] Appl. No.: 08/680,694

[22] Filed: Jul. 18, 1996

[30] Foreign Application Priority Data

Jan. 19, 1996 [JP] Japan .................................. 8-007676

[51] Int. Cl.⁶ ................................................ F16K 31/02
[52] U.S. Cl. .............................. 251/129.15; 251/129.18; 251/129.19; 335/262; 335/258
[58] Field of Search ........................ 251/129.18, 129.15, 251/129.16, 129.19, 129.2, 368; 335/337, 250, 258, 282, 299, 273, 238, 255, 262, 274

[56] References Cited

U.S. PATENT DOCUMENTS

| | | | |
|---|---|---|---|
| 2,651,744 | 9/1953 | Acklin | 251/129.19 |
| 2,827,923 | 3/1958 | Sadler | 251/129.19 |
| 4,578,662 | 3/1986 | Slavin | 335/262 |
| 4,765,587 | 8/1988 | Cummins | 251/129.19 |
| 4,813,647 | 3/1989 | Yagi | 251/129.19 |
| 5,009,390 | 4/1991 | McAuliffe | 251/129.2 |
| 5,139,227 | 8/1992 | Sumida et al. | 251/129.08 |
| 5,188,073 | 2/1993 | Ejiri | 251/129.15 |
| 5,209,455 | 5/1993 | Uetsuhara | 251/129.19 |
| 5,277,399 | 1/1994 | McCabe | 251/129.18 |
| 5,299,776 | 4/1994 | Brinn | 251/129.19 |
| 5,312,050 | 5/1994 | Schumann | 251/129.18 |
| 5,360,197 | 11/1994 | Reiter et al. | 251/337 X |
| 5,503,366 | 4/1996 | Zabeck | 251/129.18 |
| 5,518,027 | 5/1996 | Saiki | 251/368 X |
| 5,538,220 | 7/1996 | LaMarca | 251/129.15 |

FOREIGN PATENT DOCUMENTS 4-39475 2/1992 Japan .

Primary Examiner—Denise L. Ferensic
Assistant Examiner—Joanne Y. Kim
Attorney, Agent, or Firm—Sughrue, Mion, Zinn Macpeak & Seas, PLLC

[57] ABSTRACT

A higher reliable air control valve capable of improving producibility and reducing manufacturing cost without unpleasant characteristic change under operation. An air control valve includes: a bobbin wound by an energizing coil; a fixed plate for covering one end of this bobbin to construct a magnetic path; a yoke for at least partially covering the other end of said bobbin and an outer peripheral portion of the energizing coil, and being engaged with said fixed plate to constitute the magnetic path; an exterior member for constituting an exterior of said energizing coil and for making up the bobbin, the fixed plate, and the yoke in an integral form; a fixed core fitted into an inner diameter portion of said bobbin and fixed to said fixed plate; a movable core slidably inserted into the inner diameter portion of the bobbin along an axial direction and on which a valve body is slidably mounted via a spring at one end thereof along the axial direction; a return spring mounted between a spring adjusting member provided with said fixed core and said movable core; and a housing having an air inlet port, an air outlet port, and a valve seat provided in an air passage between said air inlet port and said air outlet port. Both said valve body mounted on said movable core and said valve seats of the housing constitute a valve; and said inner diameter portion of said bobbin is a guide for slidably holding said movable core along the axial direction.

6 Claims, 5 Drawing Sheets

AIR CONTROL VALVE

BACKGROUND OF THE INVENTION

The present invention relates to an air control valve for controlling a flow rate of a fluid in response to an electric signal.

An air control valve for controlling a flow rate of air in response to an energizing current is provided in, for instance, an air passage used to bypass a throttle valve of an internal combustion engine. The air control valve is used to control an idling revolution number by controlling an air amount in response to a load of the internal combustion engine.

FIG. 5 is a sectional view of the conventional air control valve employed in such a use purpose, which is disclosed in, for example, Japanese Laid-open Patent Application No. 4-39475.

In this drawing, reference numeral 10 indicates a solenoid unit of the air control valve. The solenoid unit 10 is arranged by a bobbin 11, an energizing coil 12 wound on the bobbin 11, a cylindrical yoke 13 for covering an outer peripheral portion of the energizing coil 12, a fixed plate 14 and a side plate 15, which are provided at both end surfaces of these members and constitute a magnetic path. The solenoid unit 10 is stored into a cover 17, and is fixed by a synthetic resin filling member 16. Furthermore, a sleeve 18 made of a nonmagnetic material is inserted into the inner diameter portion of the bobbin 11 and fixed therein. A fixed core 19 fixed on the fixed plate 14, and a movable core 20 slidably provided in the sleeve 18 are inserted into the inner diameter portion of the sleeve 18. A return spring 22 supported by a spring washer (spring retainer) 21 of the fixed core 19 is provided between the fixed core 19 and the movable core 20, so that the movable core 20 is energized along a direction opposite to the attraction force caused by the energizing coil 12. Reference numeral 23 indicates an external lead line of the energizing coil 12, and reference numeral 24 shows a grommet.

Reference numeral 30 indicates a valve unit of the air control valve. The valve unit 30 includes a housing 34 and a valve body 35. The housing 34 is fitted and secured to a faucet unit 15a provided on the side plate 15 of the solenoid unit 10, and includes an air inlet port 31, an air outlet port 32, and the valve seat 33 formed in an air passage defined in an intermediate portion between the air inlet port 31 and the air outlet port 32. The valve body 35 constitutes a valve together with a valve seat 33 of the housing 34, and is slidably fitted into a small diameter portion 20a of the movable core 20. The valve body 35 is depressed against a drop preventing stopper 37 provided at a tip portion of the small diameter unit 20a by a spring 36 provided between the valve body 35 and the movable core 20. It should be noted that reference numeral 38 is an adjusting screw for adjusting the characteristic of the an control valve. The adjusting spring 38 is provided between the stopper 37 and a spring retainer 40 fixed to an adjusting screw 39 provided on the housing 34. The adjusting spring 38 energizes the movable core 20 along a direction opposite to the return spring 22.

In the conventional air control valve with the above-described structure, even when the valve is under full close condition, the valve body 35 is kept under such a condition of being depressed against the stopper 7, and the spring 36 functions as a buffering operation when the valve seat 33 and the valve body 35 are closed.

When no energizing current is supplied to the energizing coil 12, the movable core 20 closes the valve by way of the return spring 22, and the energizing current is supplied to the energizing coil 12 so that, the attraction force is exerted between the fixed core 19 and the movable core 20. When this attraction force reaches a difference between the force of the adjusting spring 38 and the force of the return spring 22 applied along the direction opposite to this attraction force, the valve starts to open. When the energizing current valve is further increased, the valve open degree based upon the valve of the energizing current flowing through the energizing coil 12, or the duty ratio of the current is maintained. The air will flow from the air inlet port 31 of the housing 34 to the air outlet port 32 thereof, and an amount of this air is defined based upon the energizing current, or the duty ratio of the current.

In such an air control valve, since the sleeve 18 for holding therein the fixed core 19 and the movable core 20 is required to be made of the nonmagnetic material and for the non-corrosive material, stainless steel is usually used to manufacture the sleeve 18 in the conventional air control valve. However, this may cause the cost-up factor in view of the manufacturing stages and the material cost. Also, anti-corrosion characteristic and high accuracy are required for the valve seat 33, the cut-machined member of a brass material is employed. This may also increase the manufacturing cost.

Furthermore, the movable core 20 slidably held in the sleeve 18 along the axial direction is slidable also along the rotation direction. As a result, when a circulation stream happens to occur in the air taken from the air inlet port 31, or vibrations are applied to the conventional valve itself during operation, the valve body 35 would be rotated, so that there is a change in the relative position between the valve seat 33 and the valve body 35. In particular, when the valve open degree is low, the valve open degree characteristic with respect to the current value would be varied, and thus the revolution control would be brought into malfunction.

Furthermore, there are other problems that when the vibrations produced while the valve is fully open, and the over current are applied, the movable core 20 would collide with the fixed core 19, resulting in deterioration of durability.

SUMMARY OF THE INVENTION

The present invention has been made to solve the above-described problems, and has an object to obtain a higher reliable air control valve capable of improving producibility, and of lowering manufacturing cost thereof. Also, the present invention has another object to provide an air control valve without changing the valve characteristic under use, and without producing noise.

An air control valve, according to the present invention, is comprised of: a bobbin wound by an energizing coil; a fixed plate for covering one end of this bobbin to construct a magnetic path; a yoke for at least partially covering the other end of said bobbin and an outer peripheral portion of the energizing coil, and being engaged with said fixed plate to constitute the magnetic path; an exterior member for constituting an exterior of said energizing coil and for making up the bobbin, the fixed plate, and the yoke in an integral form; a fixed core fitted into an inner diameter portion of said bobbin and fixed to said fixed plate; a movable core slidably inserted into the inner diameter portion of the bobbin along an axial direction and on which a valve body is slidably mounted via a spring at one end thereof along the axial direction; a return spring mounted between a spring adjusting member provided with said fixed core and said movable core; and a housing having an air inlet port, an air outlet port, and a valve seat provided in an air passage between said air inlet port and said air outlet port; wherein:

both said valve body mounted on said movable core and said valve seat of the housing constitute a valve; and said inner diameter portion of said bobbin is a guide for slidably holding said movable core along the axial direction.

An inner diameter dimension of the bobbin for slidably holding the movable core is made larger than that of other portion of this bobbin, on which the energizing coil is wound.

Furthermore, the bobbin is formed of either a polyphenylene sulfide resin, or a phenol resin.

Additionally, the valve seat provided in the air passage between the air inlet and outlet ports is made of a polyphenylene sulfide resin reinforced by a titanate potassium fiber.

The spring adjusting member for setting the valve characteristic by adjusting the force of the return spring is constructed of an adjusting screw threadingly engaged with said fixed core, and a spring retainer; a corner-shaped convex portion of said spring retainer is engaged with a corner-shaped concave portion of said adjusting spring so as to prevent relative rotation between said adjusting spring and said spring retainer; and both ends of said return spring are pressure-inserted into and fixed to the spring retainer and the movable core, respectively.

In addition, corner-shaped concave portions are formed on both end surfaces of said adjusting screw.

Moreover, a minimum space valve defined between said fixed core and said movable core when said valve is open is selected to be larger than a moving distance of said movable core, defined from the valve closing condition to the fully compressed condition of the return spring.

DETAILED DESCRIPTION OF THE PREFERRED EMBODIMENT

Figure 1:
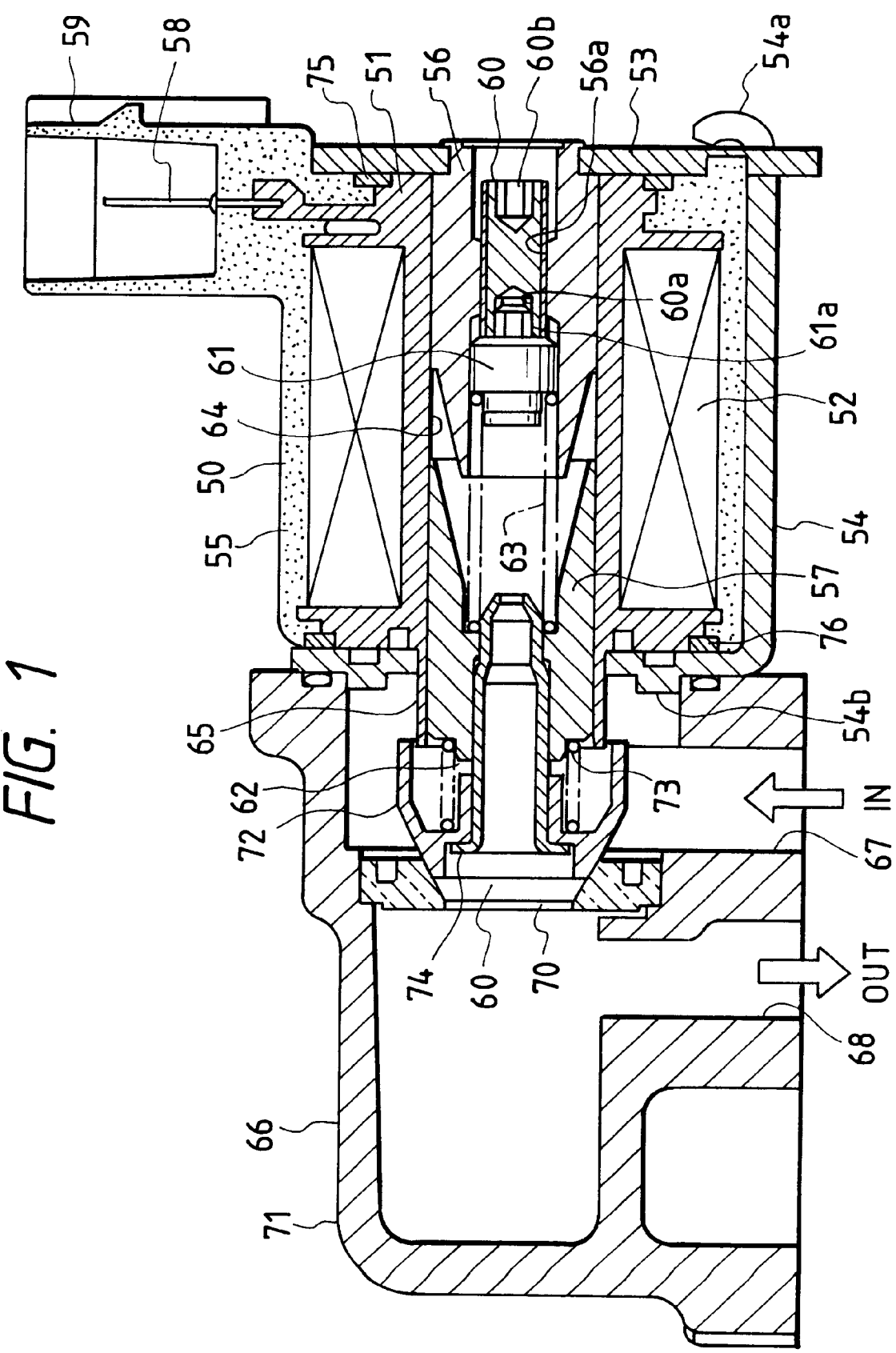
FIG. 1 is a sectional view for showing the air control valve according to the present invention.
Figure 2:
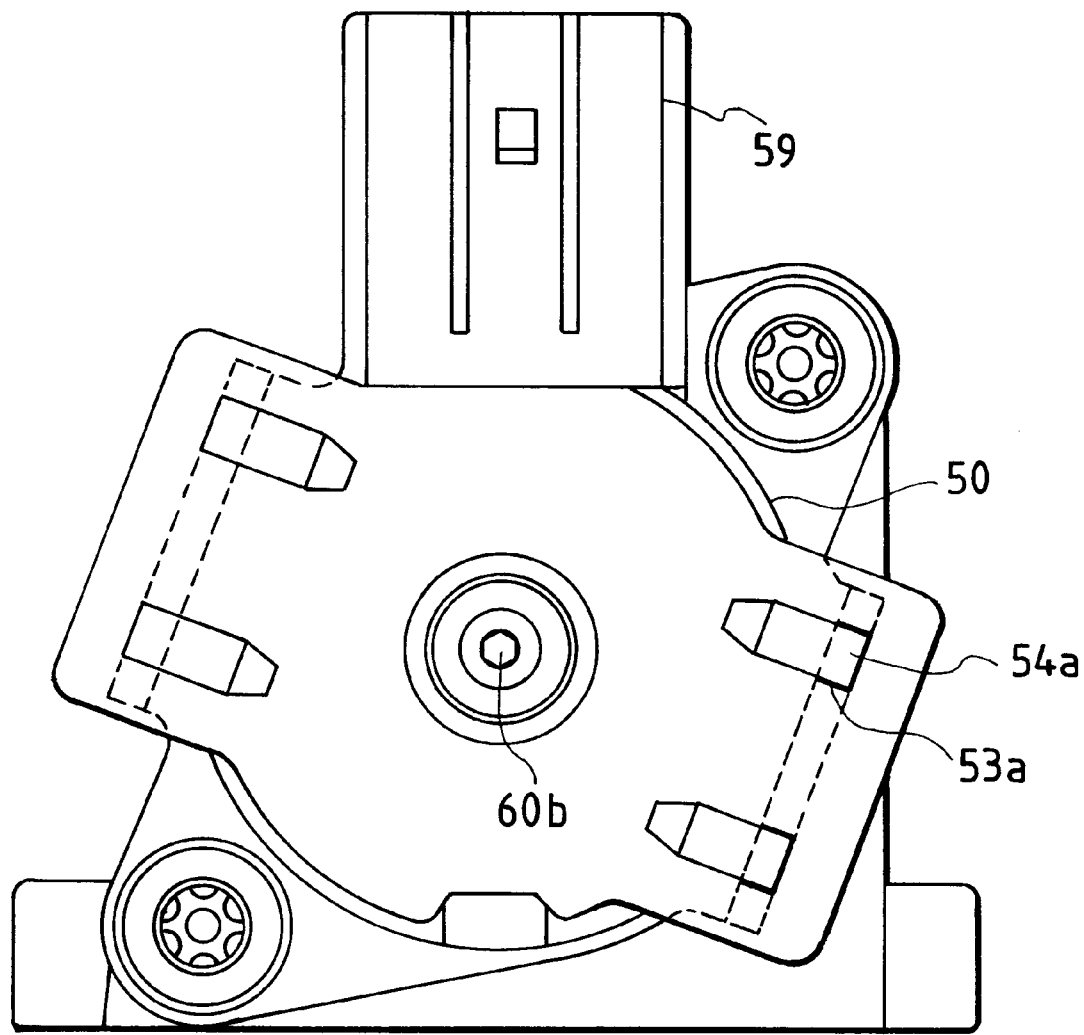
FIG. 2 is a side view for indicating the air control valve according to the present invention.
Figure 3:
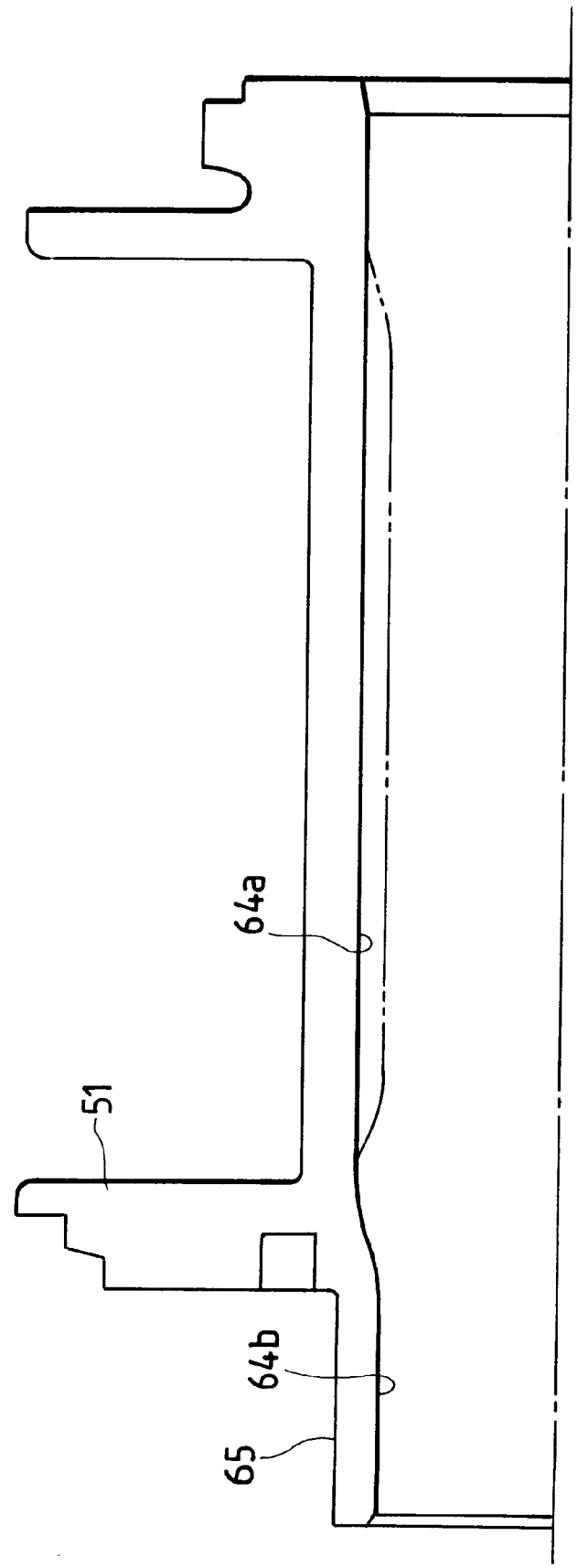
FIG. 3 is a sectional view for representing the bobbin used in this air control valve of the present invention.
Figure 4:
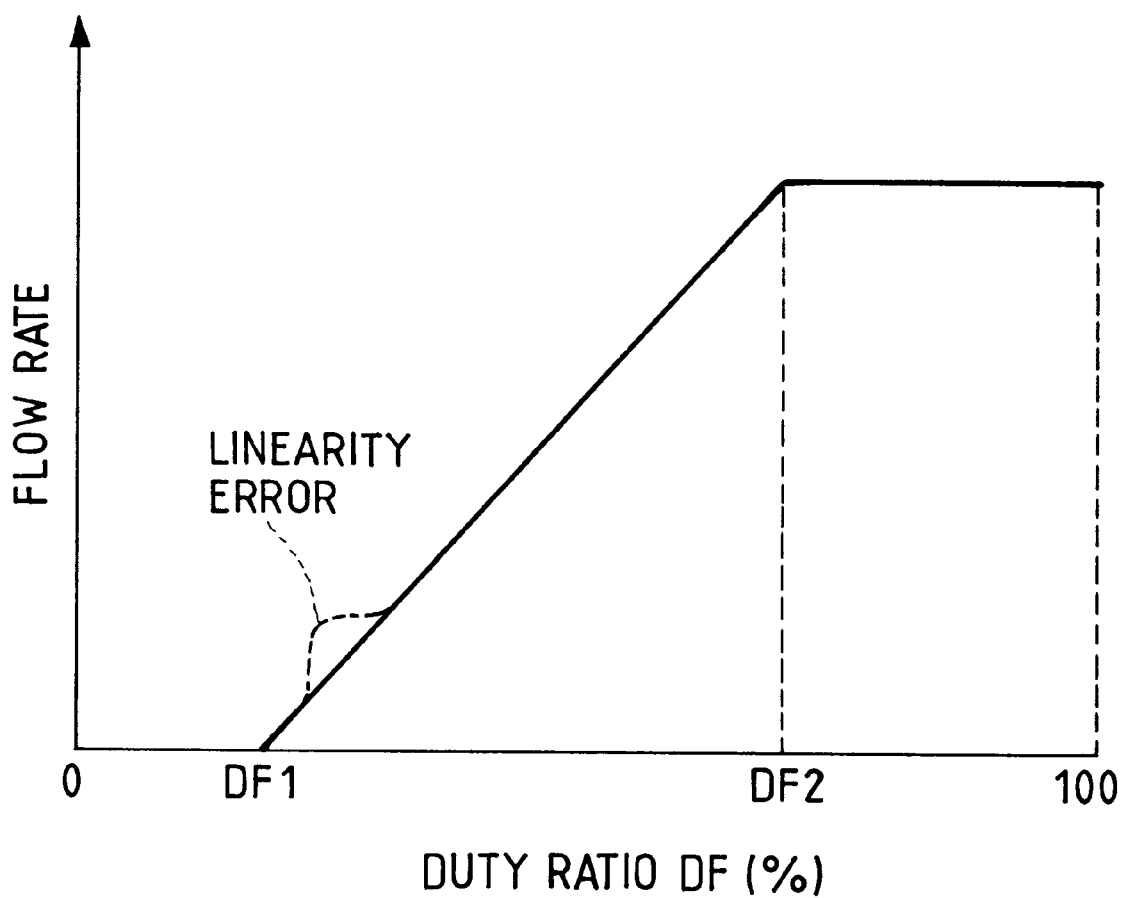
FIG. 4 is a characteristic diagram for explaining the characteristic of the air control valve.
Figure 5:
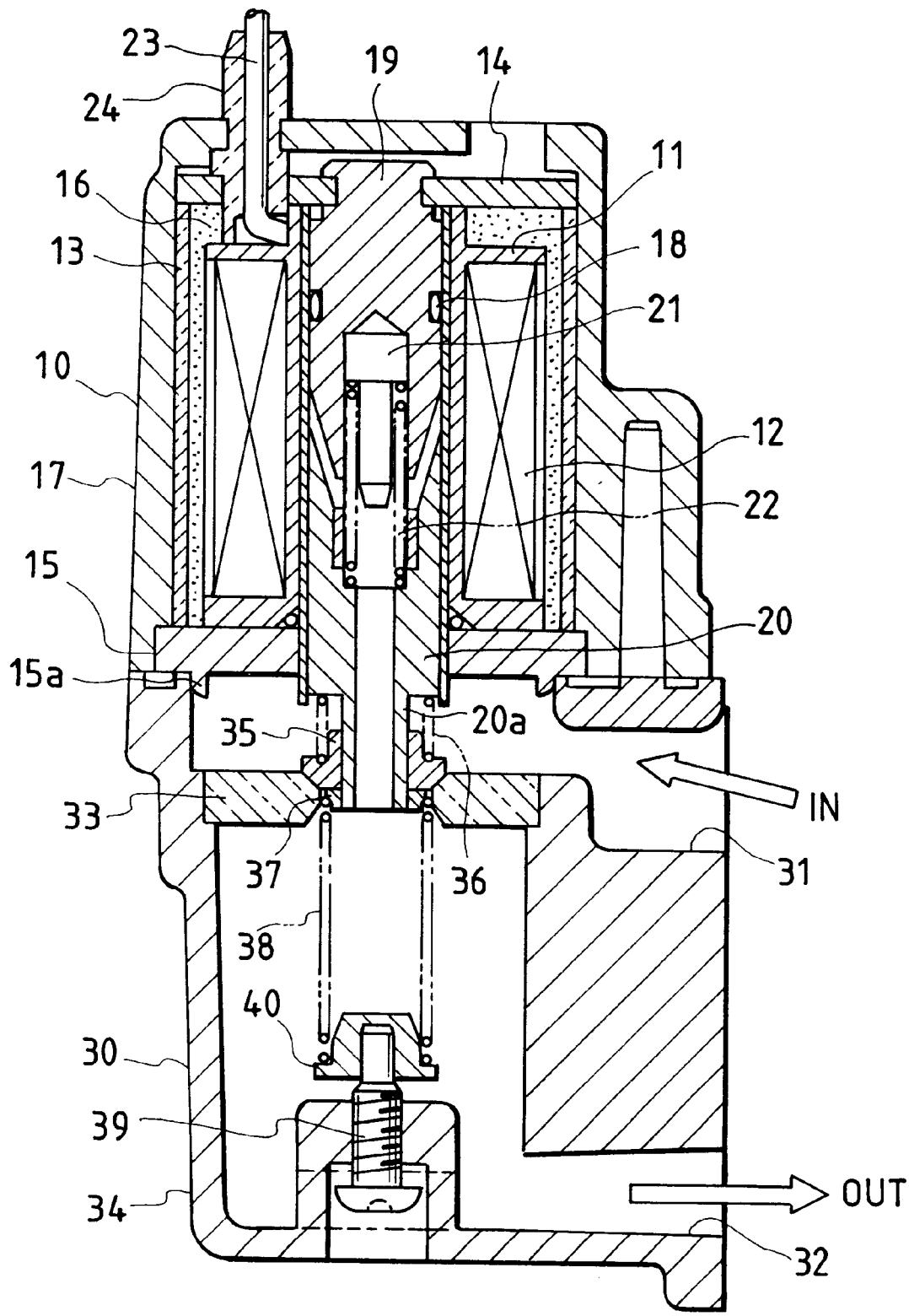
FIG. 5 is a sectional view for indicating the conventional air control valve.

FIG. 1 is a sectional diagram for representing an air control valve according to the present invention. FIG. 2 is a side view for showing the solenoid unit of the air control valve. FIG. 3 is a sectional diagram for indicating a shape of the bobbin. FIG. 4 is a characteristic diagram for explaining operations of the air control valve.

In FIG. 1 and FIG. 2, reference numeral 50 indicates a solenoid unit of the air control valve. The solenoid unit 50 is arranged by a bobbin 51, an energizing coil 52 wound on the bobbin 51, a fixed plate 53 for covering one end surface of the bobbin 51 and for constituting a magnetic path; and a synthetic resin exterior member 55 for constituting the other end of the bobbin 51 and the exterior of the energizing coil 52. The solenoid unit 50 is further constructed of a fixed core 56 fixed on the fixed plate 53 and fixedly fitted into the inner diameter portion of the bobbin 51, a movable core 57 axially movably fitted into the inner diameter portion of the bobbin 51, and a connector 59 formed integral with the synthetic resin exterior member 55 and having an external terminal 58 of the energizing coil 52. The fixed plate 53 and the yoke 54 sandwich the exterior member 55 and the bobbin 51 via the respective packing 75 and 76. A portion of the yoke 54, extending to the outer peripheral portion of the energizing coil 52, is provided with a pawl portion 54*a* at a tip thereof, which is engaged with a rectangular hole 53*a* of the fixed plate 53, and then bent to thereby be fixed.

An adjusting screw 60 is threadingly engaged with a screw hole 56*a* formed in the inner diameter portion of the fixed core 56, and corner-shaped concave portions 60*a* and 60*b* having either a quadrangle or a hexagon are formed on both end surfaces of the adjusting screw 60. A corner-shaped projection 61*a* of a spring retainer 61 is engaged with the corner-shaped concave portion 60*a*, so as to prevent the relative rotation between the adjusting screw 60 and the spring retainer 61, which constitute a spring adjusting member. Also, a cylindrical holding member 62 is pressure-inserted into and fixed to the inner diameter portion of the movable core 57. A return spring 63 is pressure-inserted into an outer peripheral portion of the holding member 62 at a side where the fixed core 56 is provided. The other end of the return spring 63 is pressure-inserted into the spring retainer 61 of the fixed core 56. Thus, the rotational movement of the movable core 57 is avoided, and also the movable core 57 is energized along a direction opposite to the attraction force exerted by the energizing coil 52. It should be noted that the corner-shaped concave portions 60*a* and 60*b* formed on the adjusting screw 60 have the same shapes, and the corner-shaped concave portion 60*b* is used to externally rotate the adjusting screw 60.

The inner diameter portion 64 of the bobbin 51 is so arranged as to slidably, or translationally hold the movable core 57 along the axial direction. To this end, an extension portion 65 required to translate the movable core 57 is provided with this inner diameter portion 64. On the other hand, to maintain precision of the inner diameter, as represented in FIG. 3, it is so fabricated that an inner diameter 64*a* of the winding portion is made larger than an inner diameter 64*b* of the extension portion 65 so as to compensate deformation of the inner diameter of the bobbin caused by tension occurred in the wires upon the coil winding operation. Furthermore, to reduce deformation caused by tension occurred in the wires upon the coil winding operation, as the material of the bobbin 51, a selection is made of, for example, either a polypheylene sulfide resin, or a phenol resin, which may have high heat resistance, and also a better creep characteristic against stress.

Reference numeral 66 shows a valve portion of the air control valve. The valve portion 66 includes a housing 71 and a valve body 72. The housing 71 is engaged with a faucet portion 54*b* formed on the yoke 54 of the solenoid unit 50 so as to be mounted thereon, and has an air inlet port 67, an air outlet port 68, and a valve seat 70 provided in an air passage formed at an intermediate portion between the air inlet port 67 and the air outlet port 68. The valve body 72 constitutes a valve together with the valve seat 70, and is slidably fitted into the holding member 62 constituting a small diameter portion of the movable core 57. The valve body 72 is depressed against a drop preventing stopper 74 formed at a tip portion of the holding member 62 by way of a spring 73 provided between this valve body 72 and the movable core 57. It should be noted that the spring force of the spring 73 is set to be stronger than that of the return spring 63, and the valve body 72 is depressed against the stopper 74 even under such a condition that the valve constructed of the valve seat 70 and the valve body 72 is fully closed.

Various requirements such as precision, durability, anti-corrosion characteristic and low shocking characteristic to the mating abuting member are needed to the valve seat 70 constituting the valve in combination with the valve body 72. According to the present invention, as the material of this valve seat 70, the valve seat is made of a polyphenylene sulfide resin reinforced by a titanate potassium fiber. This valve seat is pressure-inserted into and fixed to the inner diameter portion of the housing 71.

The full compression length of the return spring 63 is set in such a manner that a dimension of a minimum portion of a space formed between the movable core 57 and the fixed core 56 when the valve constructed of the valve seat 70 and the valve body 72 is closed is made longer than the entire travel distance of the movable core 57 defined from the full close condition of the valve to the full compression condition of the return spring 63.

In the air control valve with the above-described structure according to the present invention, when no energizing current is supplied to the energizing coil 52, the valve is closed by the return spring 63. When the energizing current is supplied to the energizing coil 52 and then either this current valve or the duty ratio of the current exceeds a constant value, the valve starts to open, as represented in a point DF1 in the characteristic diagram of FIG. 4. As either the current valve, or the duty ratio is further increased, the open degree of the valve becomes larger, so that the air flow rate is increased. When the open degree of the valve reaches a constant value, the air flow rate is saturated as shown by a point DF2. While the open degree of the valve is small, even when the space between the valve body 72 and the valve seat 70 is slightly varied, the air flow rate is changed with a large changing ratio. As a result, when the movable core is rotated during the valve operation in the above-described conventional air control valve, the air flow rate would be varied as indicated by a dotted line of FIG. 4, resulting in the characteristic problem. To the contrary, in accordance with the air control valve of the present invention, since the rotational movement of the movable core can be prevented by engaging the corner-shaped concave portion 60A of the adjusting screw 60 functioning as the spring adjusting member with the corner-shaped projection 61a of the spring washer 61, and also by pressure-inserting and fixing the return spring 63 into the spring retainer 61 and the movable core 57, it is possible to avoid such a characteristic problem of the conventional air control valve. Furthermore, since the corner-shaped concave portions 60a and 60b having the same shapes are provided on both ends of the adjusting screw 60, the selection of directivity is no longer required, and also productivity during the assembling work can be improved.

Also, since the movable core 57 is directly held by the inner diameter portion of the bobbin 51, and the shape as well as the material of the inner diameter portion of the bobbin 51 are properly selected, a stable valve operation can be realized even when the sleeve employed in the conventional air control valve is not used. And, the manufacturing stages and the material can be reduced. Furthermore, the polypheylene sulfide resin reinforced by the titanate potassium fiber used in the valve seat 70 can have the better creep characteristic, and also can have the better anti-wearing characteristic for the valve body 72. Therefore, durability and producibility can be improved. In addition, when the valve is under close condition, the dimension of the minimum portion of the space formed between the movable core 57 and the fixed core 56 is made longer than the entire travel distance of the movable core 57 defined from the full close condition of the valve to the full compression condition of the return spring 63. As a consequence, even when the vibrations and the over current are applied, the movable core 57 does not collide with the fixed core 56, and the reliability of the air control valve can be improved.

What is claimed is:

1. An air control valve, comprising:

a bobbin wound by an energizing coil;

a fixed plate for covering a first end of said bobbin and constructing a magnetic path;

a yoke for at least partially covering a second end of said bobbin and an outer peripheral portion of the energizing coil, said yoke being engaged with said fixed plate to constitute the magnetic path;

an exterior member for constituting an exterior of said energizing coil and for integrating the bobbin, the fixed plate, and the yoke;

a fixed core fitted into an inner diameter portion of said bobbin and fixed to said fixed plate;

a movable core axially movably inserted into the inner diameter portion of the bobbin, said movable core having a valve body axially movably mounted onto a first end of said movable core via a spring;

a return spring mounted between said movable core and a spring adjusting member provided on said fixed core; and a housing having an air inlet port, an air outlet port, and a valve seat provided in an air passage between said air inlet port and said air outlet port;

wherein said valve body mounted on said movable core and said valve seat of said housing cooperatively constitute a valve, wherein said inner diameter portion of said bobbin serves as a guide for axially movably holding said movable core, and wherein said bobbin is made of a synthetic resin and comprises:
  a first portion on which said energizing coil is wound; and
  a second portion,
  wherein an inner diameter of said first portion of said bobbin is made greater than an inner diameter of said second portion of said bobbin before said energizing coil is wound on said first portion and said inner diameter of said first portion is essentially equal to said inner diameter of said second portion after said energizing coil is wound on said first portion.

2. An air control valve as claimed in claim 1, wherein the energizing coil is not wound on said second portion of said bobbin.

3. An air control valve comprising:

a bobbin wound by an energizing coil;

a fixed plate for covering a first end of said bobbin and constructing a magnetic path;

a yoke for at least partially covering a second end of said bobbin and an outer peripheral portion of the energizing coil, said yoke being engaged with said fixed plate to constitute the magnetic path;

an exterior member for constituting an exterior of said energizing coil and for integrating the bobbin, the fixed plate, and the yoke;

a fixed core fitted into an inner diameter portion of said bobbin and fixed to said fixed plate;

a movable core axially movably inserted into the inner diameter portion of the bobbin, said movable core having a valve body axially movably mounted onto a first end of said movable core via a spring;

a return spring mounted between said movable core and a spring adjusting member provided on said fixed core; and a housing having an air inlet port, an air outlet port, and a valve seat provided in an air passage between said air inlet port and said air outlet port;

wherein said valve body mounted on said movable core and said valve seat of said housing cooperatively constitute a valve, wherein said inner diameter portion of said bobbin serves as a guide for axially movably holding said movable core, wherein said spring adjusting member includes an externally accessible adjusting screw threadingly engaged with said fixed core for adjusting the spring bias, and a spring retainer, wherein a corner-shaped convex portion of said spring retainer is engaged with a corner-shaped concave portion of said adjusting screw so as to prevent relative rotation therebetween, and wherein ends of said return spring are pressure-inserted into and fixed to said spring retainer and said movable core, respectively.

4. An air control valve as claimed in claim 3 wherein:

said corner-shaped concave portion is formed on one end surface of said adjusting screw and another corner-shaped concave portion identical in configuration to said former corner-shaped concave portion is formed on opposite end surface of said adjusting screw.

5. An air control valve comprising:

a bobbin wound by an energizing coil;

a fixed plate for covering a first end of said bobbin and constructing a magnetic path;

a yoke for at least partially covering a second end of said bobbin and an outer peripheral portion of the energizing coil, said yoke being engaged with said fixed plate to constitute the magnetic path;

an exterior member for constituting an exterior of said energizing coil and for integrating the bobbin, the fixed plate, and the yoke;

a fixed core fitted into an inner diameter portion of said bobbin and fixed to said fixed plate;

a movable core axially movably inserted into the inner diameter portion of the bobbin, said movable core having a valve body axially movably mounted onto a first end of said movable core via a spring;

a return spring mounted between said movable core and a spring adjusting member provided on said fixed core; and a housing having an air inlet port, an air outlet port, and a valve seat provided in an air passage between said air inlet port and said air outlet port;

wherein said valve body mounted on said movable core and said valve seat of said housing cooperatively constitute a valve, wherein said inner diameter portion of said bobbin serves as a guide for axially movably holding said movable core, wherein a minimum space value is defined between said fixed core and said movable core when said valve is closed, wherein a moving distance of said movable core is defined as a distance that said movable core moves from a first position at which the valve is closed to a second position at which said return spring is mechanically fully compressed, wherein said minimum space value is larger than said moving distance, wherein a portion of said movable core surrounds a portion of said fixed core when said return spring is mechanically fully compressed, and wherein said movable core and said fixed core are spaced apart when said return spring is mechanically fully compressed, and wherein said movable core is prevented from contacting said fixed core by the force of said return spring.

6. An air control valve comprising:

a bobbin wound by an energizing coil;

a fixed plate for covering a first end of said bobbin and constructing a magnetic path;

a yoke for at least partially covering a second end of said bobbin and an outer peripheral portion of the energizing coil, said yoke being engaged with said fixed plate to constitute the magnetic path;

an exterior member for constituting an exterior of said energizing coil and for integrating the bobbin, the fixed plate, and the yoke;

a fixed core fitted into an inner diameter portion of said bobbin and fixed to said fixed plate;

a movable core axially movably inserted into the inner diameter portion of the bobbin, said movable core having a valve body axially movably mounted onto a first end of said movable core via a spring;

a return spring mounted between said movable core and a spring adjusting member provided on said fixed core; and a housing having an air inlet port, an air outlet port, and a valve seat provided in an air passage between said air inlet port and said air outlet port;

wherein said valve body mounted on said movable core and said valve seat of said housing cooperatively constitute a valve, wherein said inner diameter portion of said bobbin serves as a guide for axially movably holding said movable core, wherein one end of said return spring is non-rotatably coupled to said spring adjusting member provided on said fixed core, and another end of said return spring is non-rotatably coupled to said movable core, and wherein said bobbin is made of a synthetic resin and comprises:

a first portion on which said energizing coil is wound; and a second portion, wherein an inner diameter of said first portion of said bobbin is made greater than an inner diameter of said second portion of said bobbin before said energizing coil is wound on said first portion and said inner diameter of said first portion is essentially equal to said inner diameter of said second portion after said energizing coil is wound on said first portion.

* * * * *